United States Patent [19]
Miyashita et al.

[11] Patent Number: 5,295,416
[45] Date of Patent: Mar. 22, 1994

[54] AIR-FUEL RATIO CONTROL METHOD FOR INTERNAL COMBUSTION ENGINES

[75] Inventors: Yukio Miyashita; Hiroshi Mifune; Kunio Noguchi; Hironao Fukuchi, all of Wako, Japan

[73] Assignee: Honda Giken Kogyo Kabushiki Kaisha, Tokyo, Japan

[21] Appl. No.: 761,149

[22] Filed: Sep. 17, 1991

[30] Foreign Application Priority Data

Sep. 17, 1990 [JP] Japan ............... 2-246723

[51] Int. Cl.⁵ .................................. F16H 59/68
[52] U.S. Cl. ................................................ 74/860
[58] Field of Search ........................ 74/857, 860

[56] References Cited

U.S. PATENT DOCUMENTS

| 3,783,847 | 1/1974 | Kolody | 123/119 A |
| 4,120,214 | 10/1978 | Toda et al. | 74/860 |
| 4,383,456 | 5/1983 | Ganoung | 74/866 |
| 4,474,081 | 10/1984 | Kinugasa et al. | 74/844 |
| 4,596,164 | 6/1986 | Hasegawa et al. | 74/860 |
| 4,732,130 | 3/1988 | Suzuki | 123/480 |
| 4,757,683 | 7/1988 | Kawanabe et al. | 60/274 |
| 4,811,223 | 3/1989 | Iwatsuki et al. | 364/424.1 |
| 4,823,642 | 4/1989 | Iwaki et al. | 74/860 |
| 4,840,245 | 6/1989 | Kamei et al. | 180/179 |
| 4,848,303 | 7/1989 | Fujimoto et al. | 123/571 |
| 4,966,111 | 10/1990 | Fujimoto et al. | 123/399 |
| 4,989,563 | 2/1991 | Fukutomi et al. | 123/327 |
| 5,016,494 | 5/1991 | Yamaguchi | 74/858 |
| 5,178,041 | 1/1983 | Takada | 74/857 |
| 5,209,213 | 5/1993 | Miyashita et al. | 123/687 |

FOREIGN PATENT DOCUMENTS 49-33289 9/1974 Japan.
59-208141 11/1984 Japan.

Primary Examiner—Dirk Wright
Attorney, Agent, or Firm—Armstrong, Westerman, Hattori, McLeland & Naughton

[57] ABSTRACT

An air-fuel ratio control method for an internal combustion engine. The air-fuel ratio of an air-fuel mixture supplied to the engine is feedback-controlled to a desired air-fuel ratio dependent on operating conditions of the engine. When a transmission is being shifted or before a predetermined time period elapses after the shifting, the desired air-fuel ratio is held at a value assumed immediately before the shifting of the transmission. In another form of the invention, when the transmission is being shifted, or when the operating characteristics of at least one set of a set of intake valves and a set of exhaust valves have been not changed before the predetermined time period elapses after the shifting of the transmission, the desired air-fuel ratio is held at a value assumed before the shifting of the transmission.

9 Claims, 3 Drawing Sheets

AIR-FUEL RATIO CONTROL METHOD FOR INTERNAL COMBUSTION ENGINES

BACKGROUND OF THE INVENTION

The present invention relates to a method of feedback-controlling the air-fuel ratio of an internal combustion engine, and more particularly, it relates to a method of this kind wherein the air-fuel mixture supplied to the engine is feedback-controlled in response to the output of an exhaust gas ingredient concentration sensor having output characteristics in approximate proportion to the exhaust gas ingredient concentration.

Among methods of feedback-controlling the air-fuel ratio of an air-fuel mixture supplied to an internal combustion engine (referred to hereinafter as "supply air-fuel ratio") to a desired air-fuel ratio in response to the output of an exhaust gas ingredient concentration sensor having output characteristics proportional to the exhaust gas ingredient concentration, there is one proposed e.g. by Japanese Provisional Patent Publication (Kokai) No. 59-208141, in which the desired air-fuel ratio is changed according to operating conditions of the engine.

In the meanwhile, a system for controlling operating characteristics (valve lift amount, valve opening timing, etc.) of at least one set of a set of intake valves and a set of exhaust valves has been proposed e.g. by Japanese Patent Publication Kokoku No. 49-33289, in which the operating characteristics of at least one set of the valves is changeable between operating characteristics suitable for a low engine rotational speed region and operating characteristics suitable for a high engine rotational speed, one of the two kinds of operating characteristics being selected according to operating conditions of the engine.

In the above proposed air-fuel ratio control method, the desired air-fuel ratio is changed, specifically, in response to the engine coolant temperature and/or the throttle valve opening. However, it does not take into consideration changes in operating conditions of the engine (in this case, particularly a change in the throttle valve opening) occurring when the gear position of a transmission driven by the engine has been changed, and therefore the proposed method has a problem that the supply air-fuel ratio temporarily undergoes a large deviation from a desired value due to a drastic change in the desired air-fuel ratio occurring when the gear position of the transmission is changed.

Further, when the conventional air-fuel ratio control method is applied to an engine in which the operating characteristics of the intake and/or exhaust valves can be changed over, it is necessary to set the desired air-fuel ratio while taking into consideration a change in the operating characteristics of the valves as well as a change in the gear position of the transmission.

SUMMARY OF THE INVENTION

It is therefore the object of the invention to provide an air-fuel ratio control method for an internal combustion engine, which is capable of properly setting the desired air-fuel ratio when the gear position of a transmission is changed, to thereby prevent fluctuations in the supply air-fuel ratio.

To attain the above object, according to a first aspect of the present invention, there is provided an air-fuel ratio control method for an internal combustion engine having an exhaust passage, an exhaust gas ingredient concentration sensor arranged in the exhaust passage for sensing the concentration of an ingredient in exhaust gases from the engine, and a transmission, wherein the air-fuel ratio of an air-fuel mixture supplied to the engine is feedback-controlled in response to output from the exhaust gas ingredient concentration sensor to a desired air-fuel ratio dependent on operating conditions of the engine.

The air-fuel ratio control method according to the first aspect of the invention is characterized by comprising the steps of:

(1) determining whether or not the transmission is being shifted;

(2) determining whether or not a predetermined time period has elapsed after shifting of the transmission, if the transmission is not being shifted; and (3) when the transmission is being shifted or before the predetermined time period elapses after the shifting, holding the desired air-fuel ratio at a value assumed immediately before the shifting of the transmission.

The exhaust gas ingredient concentration sensor has output characteristics approximately proportionate to the concentration of the ingredient in the exhaust gases.

More specifically, the amount of fuel supplied to the engine is determined by multiplying a basic fuel amount by a desired air-fuel ratio coefficient set in response to the operating conditions of the engine and representing the desired air-fuel ratio and an air-fuel ratio correction coefficient calculated based on the desired air-fuel ratio coefficient and the output from the exhaust gas ingredient concentration sensor, the step (3) comprising holding the desired air-fuel ratio coefficient at a value thereof assumed immediately before the shifting of the transmission.

According to a second aspect of the invention, there is provided an air-fuel ratio control method for an internal combustion engine having a set of intake valves and a set of exhaust valves, at least one set of the set of intake valves and the set of exhaust valves having operating characteristics thereof changeable between ones suitable for a low engine rotational speed region and ones suitable for a high engine rotational speed region, an exhaust passage, an exhaust gas ingredient concentration sensor arranged in the exhaust passage for sensing the concentration of an ingredient in exhaust gases from the engine, and a transmission, wherein the air-fuel ratio of an air-fuel mixture supplied to the engine is feedback-controlled in response to output from the exhaust gas ingredient concentration sensor to a desired air-fuel ratio dependent on operating conditions of the engine.

The air-fuel ratio control method according to the second aspect of the invention is characterized by comprising the steps of:

(1) determining whether or not the transmission is being shifted;

(2) determining whether or not a predetermined time period has elapsed after shifting of the transmission, if the transmission is not being shifted;

(3) determining whether or not the operating characteristics of the at least one set of the set of intake valves and the set of exhaust valves have been changed, if the predetermined time period has not elapsed after the shifting of the transmission; and (4) when the transmission is being shifted, or when the operating characteristics of the at least one set of the set of intake valves and the set of exhaust valves have been not changed before the predetermined time period elapses after the shifting of the transmission, holding the desired air-fuel ratio at a value assumed immediately before the shifting of the transmission.

Preferably, the desired air-fuel ratio is set to a value dependent on a present operating condition of the engine, when the operating characteristics of the at least one set of the set of intake valves and the set of exhaust valves have been changed before the predetermined time period elapses after the shifting of the transmission.

For example, the engine is installed on an automotive vehicle having a clutch, and the determination as to whether or not the transmission is being shifted in the step (1) is effected by determining whether the clutch is disengaged or engaged.

The above and other objects, features and advantages of the invention will become more apparent from the ensuing detailed description taken in conjunction with the accompanying drawings.

BRIEF DESCRIPTION OF THE DRAWINGS

FIG. 2 divided into

DETAILED DESCRIPTION

The method according to the invention will now be described in detail with reference to the drawings showing an embodiment thereof.

Figure 1:
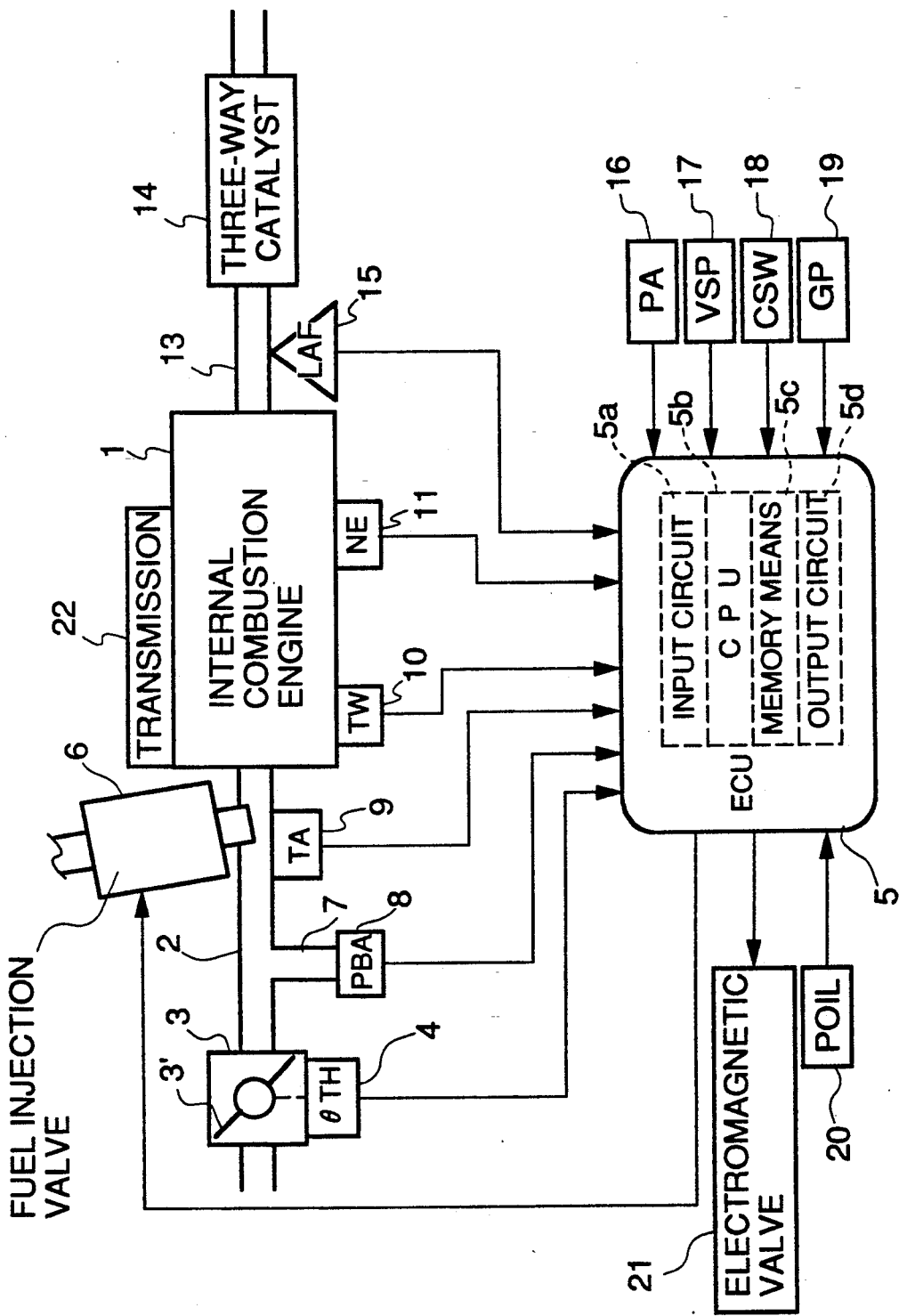
FIG. 1 is a block diagram illustrating the whole arrangement of a fuel supply control system for carrying out the control method of the invention.

Referring first to FIG. 1, there is shown the whole arrangement of a fuel supply control system which is adapted to carry out the control method of this invention. In the figure, reference numeral 1 designates a DOHC straight type four cylinder engine, each cylinder being provided with a pair of intake valves and a pair of exhaust valves, not shown. This engine 1 is arranged such that the operating characteristics of the intake valves and exhaust valves (more specifically, the valve opening period and the lift (generically referred to hereinafter as "valve timing") permit selection between a high speed valve timing adapted to a high engine speed region and a low speed valve timing adapted to a low engine speed region.

In an intake pipe 2 of the engine 1, there is arranged a throttle body 3 accommodating a throttle body 3' therein. A throttle valve opening ($\theta$TH) sensor 4 is connected to the throttle valve 3' for generating an electric signal indicative of the sensed throttle valve opening and supplying same to an electronic control unit (hereinafter referred to as "the ECU") 5.

Fuel injection valves 6 are each provided for each cylinder and arranged in the intake pipe between the engine I and the throttle valve 3, and at a location slightly upstream of an intake valve, not shown. The fuel injection valves 6 are connected to a fuel pump, not shown, and electrically connected to the ECU 5 to have their valve opening periods controlled by signals therefrom.

An electromagnetic valve 21 is connected to the output side of the ECU 5 to selectively control the aforementioned valve timing, the opening and closing of this electromagnetic valve 21 being controlled by the ECU 5. The valve 21 selects either high or low hydraulic pressure applied to a valve timing selection mechanism, not shown. Corresponding to this high or low hydraulic pressure, the valve timing is thereby adjusted to either a high speed valve timing or a low speed valve timing. The hydraulic pressure applied to this selection mechanism is detected by a hydraulic pressure (oil pressure) (POIL) sensor 20 which supplies a signal indicative of the sensed hydraulic pressure to the ECU 5.

Further, an intake pipe absolute pressure (PBA) sensor 8 is provided in communication with the interior of the intake pipe 2 via a conduit 7 at a location immediately downstream of the throttle valve 3' for supplying an electric signal indicative of the sensed absolute pressure to the ECU 5. An intake temperature (TA) sensor 9 is inserted into the intake pipe 2 at a location downstream of the intake pipe absolute pressure sensor 8 for supplying an electric signal indicative of the sensed intake temperature TA to the ECU 5.

An engine coolant temperature (TW) sensor 10, which may be formed of a thermistor or the like, is mounted in the cylinder block of the engine 1 for supplying an electric signal indicative of the sensed engine coolant temperature TW to the ECU 5. An engine rotational speed (NE) sensor II and a cylinder-discriminating (CYL) sensor 12 are arranged in facing relation to a camshaft or a crankshaft of the engine 1, neither of which is shown. The engine rotational speed sensor II generates a pulse as a TDC signal pulse at each of predetermined crank angles whenever the crankshaft rotates through 180 degrees, while the cylinder-discriminating sensor 12 generates a pulse at a predetermined crank angle of a particular cylinder of the engine, both of the pulses being supplied to the ECU 5.

A three-way catalyst 14 is arranged within an exhaust pipe 13 connected to the cylinder block of the engine 1 for purifying noxious components such as HC, CO and $NO_x$. An $O_2$ sensor 15 as an exhaust gas ingredient concentration sensor (referred to hereinafter as an "LAF sensor") is mounted in the exhaust pipe 13 at a location upstream of the three-way catalyst 14, for supplying an electric signal having a level approximately proportional to the Oxygen concentration in the exhaust gases to the ECU 5.

The crankshaft of the engine is connected to a transmission 22 installed on an automotive vehicle, not shown.

Further electrically connected to the ECU 5 are an atmospheric pressure (PA) sensor 16, a vehicle speed sensor 17, a clutch sensor 18 for detecting when the clutch is engaged and disengaged, and a gear position sensor 19 for detecting the shift position (gear position) of the transmission. The signals from all these sensors are supplied to the ECU 5.

The ECU 5 comprises an input circuit 5a having the functions of shaping the waveforms of input signals from various sensors, shifting the voltage levels of sensor output signals to a predetermined level, converting analog signals from analog-output sensors to digital signals, and so forth, a central processing unit (hereinafter referred to as "the CPU") 5b, memory means 5c storing various operational programs which are executed in the CPU 5b and for storing results of calculations therefrom, etc., and an output circuit 5d which outputs driving signals to the fuel injection valves 6 and the electromagnetic valve 21.

The CPU 5b operates in response to the above-mentioned signals from the sensors to determine operating conditions in which the engine 1 is operating such as an air-fuel ratio feedback control region and open-loop control regions, and calculates, based upon the determined operating conditions, the valve opening period or fuel injection period $T_{OUT}$ over which the fuel injection valves 6 are to be opened by the use of the following equation (1) in synchronism with inputting of TDC signal pulses to the ECU 5:

$$T_{OUT} = Ti \times KCMDM \times KLAF \times K_1 + K_2 \quad (1)$$

where Ti represents a basic fuel amount, more specifically a basic fuel injection period which is determined according to the engine rotational speed NE and the intake pipe absolute pressure PBA. The value of Ti is determined by a Ti map stored in the memory means 5c.

KCMDM is a modified desired air-fuel ratio coefficient which is set by means of a program shown in FIG. 2, described hereinafter, according to engine operating conditions, and calculated by multiplying a desired air-fuel ratio coefficient KCMD representing a desired air-fuel ratio by a fuel cooling correction coefficient KETV. The correction coefficient KETV is intended to apply a prior correction to the fuel injection amount in view of the fact that the supply air-fuel ratio varies due to the cooling effect produced when fuel is actually injected, and its value is set according to the value of the desired air-fuel ratio coefficient KCMD. Further, as will be clear from the aforementioned equation (1), the fuel injection period $T_{OUT}$ increases if the desired fuel-air injection ratio coefficient KCMD increases, so that the values of KCMD and KCMDM will be in direct proportion to the reciprocal of the air-fuel ratio A/F.

KLAF is an air-fuel ratio correction coefficient which is set such that the air-fuel ratio detected by the LAF sensor 15 during feedback control coincides with the desired air-fuel ratio, and is set to predetermined values depending on engine operating conditions during open-loop control.

$K_1$ and $K_2$ are other correction coefficients and correction variables, respectively, which are calculated based on various engine parameter signals to such values as to optimize characteristics of the engine such as fuel consumption and accelerability depending on engine operating conditions.

The CPU 5b outputs a valve timing selection command signal depending on engine operating conditions, which causes opening and closing of the electromagnetic valve 21.

The CPU 5b performs calculations as described hereintofore, and supplies the fuel injection valves 6 and electromagnetic valve 21 with driving signals based on the calculation results through the output circuit 5d.

Figure 2A:
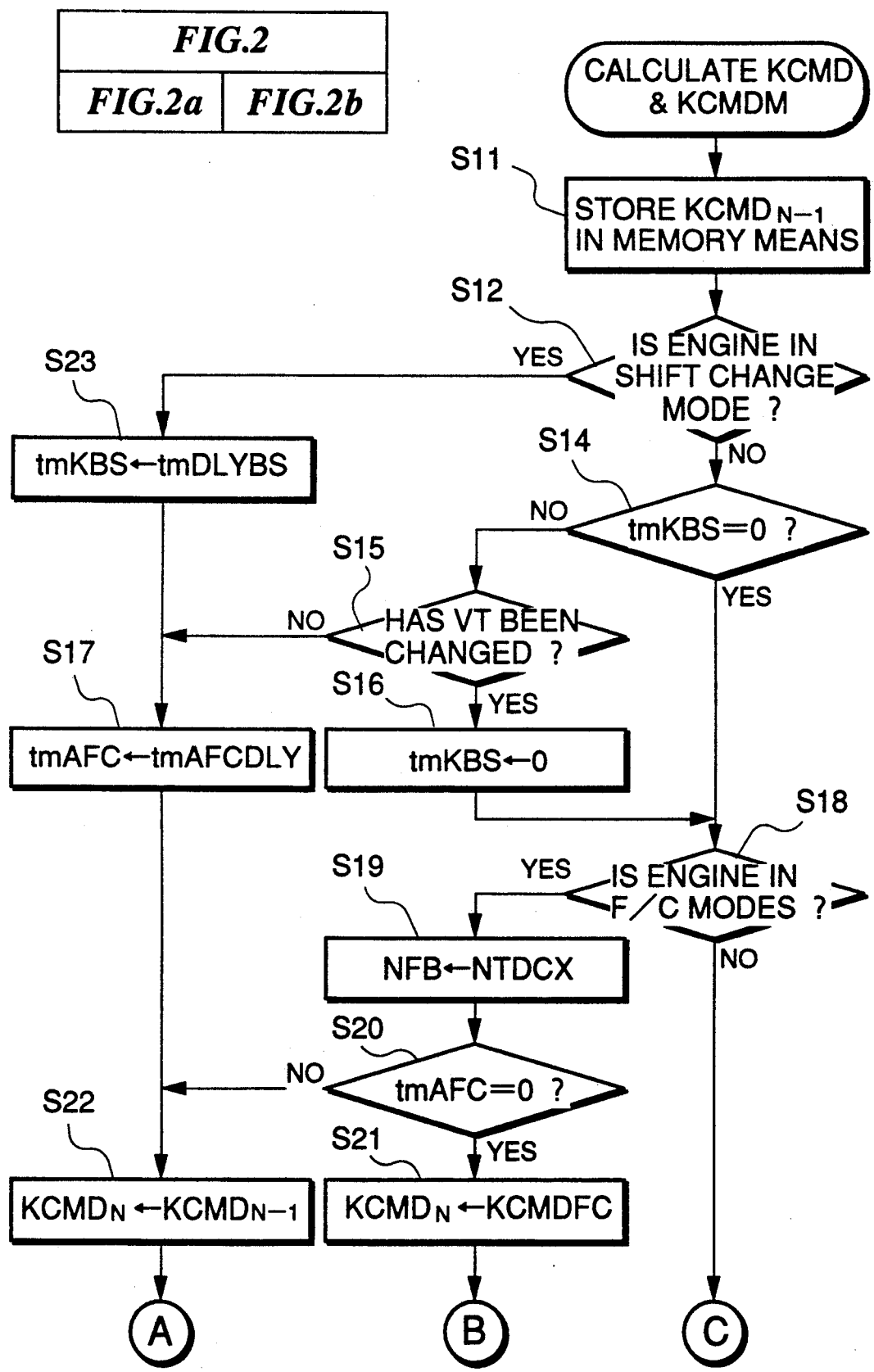
FIGS. 2A and 2B, is a flowchart of a program for calculating a desired air-fuel ratio coefficient (KCMD) and a modified desired air-fuel ratio coefficient (KCMDM).
Figure 2B:
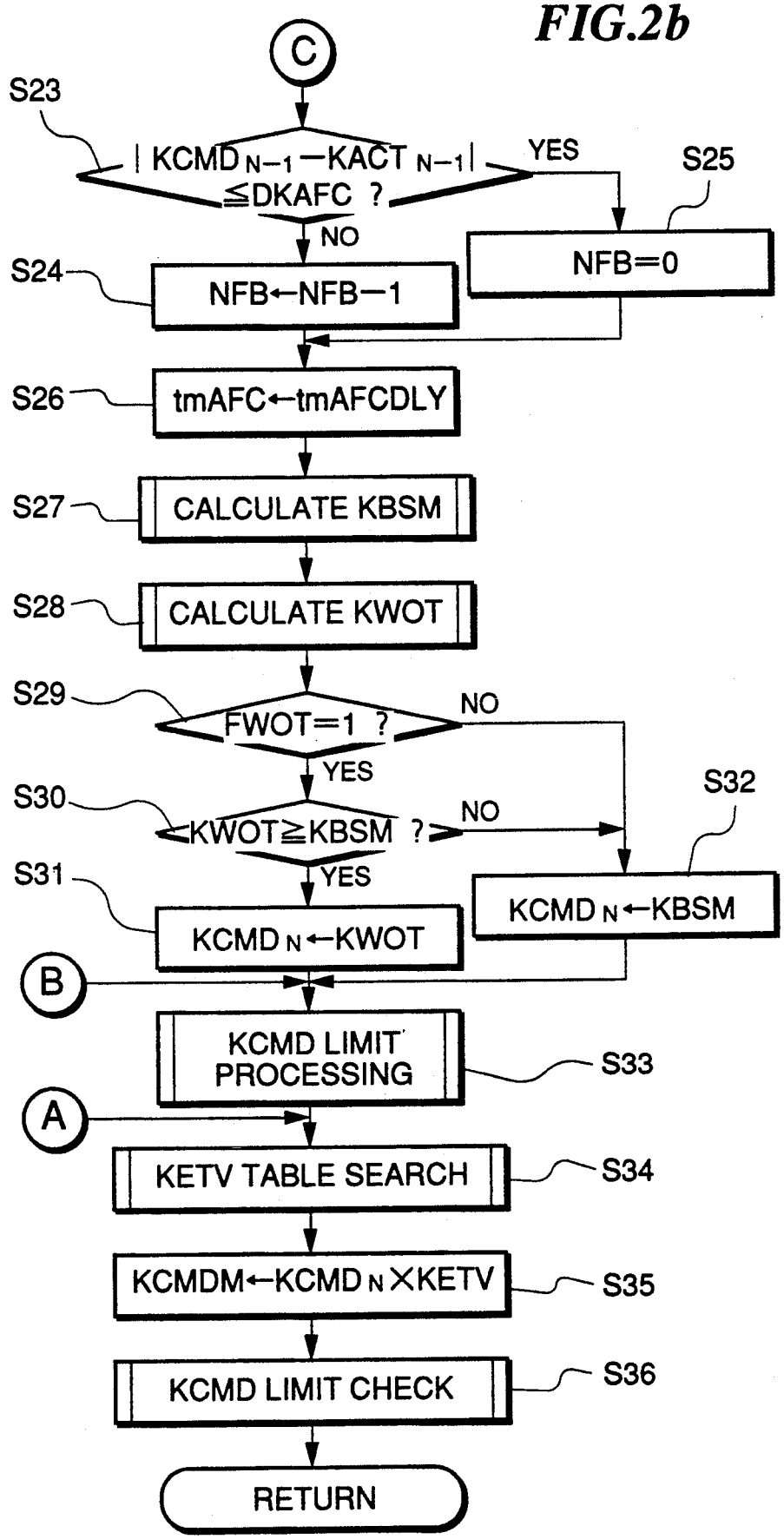

FIG. 2 shows a flowchart of a program which calculates the desired air-fuel ratio coefficient KCMD and modified air-fuel ratio coefficient KCMDM. This program is carried out in synchronism with inputting of each TDC signal pulse to the ECU 5.

At a step S11, the calculation value $KCMD_{N-1}$ of the desired air-fuel ratio coefficient KCMD in the immediately preceding loop is stored in the memory means 5c. The memory means 5c can store for example 15 values of KCMD, so that the results of calculating KCMD in a maximum of up to 15 preceding loops can be read and used. At a step S12 it is determined whether or not the engine is in shift change mode. (i.e. whether or not the transmission is being shifted). This determination depends on the output signal from the clutch sensor 18 detecting whether or not the clutch is engaged. If the answer to the question of the step S12 is affirmative (YES), i.e. if the engine is in the shift change mode, an after-shift change timer tmKBS for measuring the time period elapsed after termination of shift change, is set to a predetermined after-shift change period tmDLYBS (e.g. 500 milliseconds) and the timer is started (step S13). Further, an F/C timer tmAFC for measuring the fuel cut period is set to a predetermined F/C period tmAFCDLY (300 milliseconds), and the timer is started (step S17). Then the value of KCMD in the present loop, i.e. $KCMD_N$, is set to a value assumed in the immediately preceding loop, $KCMD_{N-1}$ (step S22), and the program proceeds to a step S34.

If the answer to the question of the step S12 is negative (NO), i.e. if the engine is not in the shift change mode, it is determined whether or not the count value of the after-shift change timer tmKBS is equal to 0 (step S14). If the answer to this question is affirmative (YES), i.e. if the predetermined time period tmDLYBS has elapsed after termination of shift change, the program proceeds immediately to a step S18. If the answer to this question is negative (NO), i.e. if the predetermined time period tmDLYBS has not elapsed after termination of shift change, it is determined whether or not the valve timing has been changed (step S15). If the answer to the question of the step S15 is negative (NO), the program proceeds to the step S17, while if the answer is affirmative (YES), the after-shift change timer tmKBS is set equal to 0 and the program proceeds to the step S18.

In this manner, the desired air-fuel ratio coefficient KCMD is held at a value assumed in the immediately preceding loop during shift change and before the predetermined time period tmDLYBS elapses after termination of shift change. However, even on these occasions, if the valve timing has been changed, the program proceeds immediately to the step S18. The desired air-fuel ratio therefore is prevented from largely fluctuating due to a change in the engine operating condition during shift change or immediately after shift change, and hence deviation of the supply air-fuel ratio from the desired value is prevented. Further, in this embodiment, when high speed valve timing has been selected, KCMD is not set to a leaner value than the stoichiometric air-fuel ratio (A/F = 14.7) (inhibition of so-called "lean burn"), though this is not shown. However, there is the possibility that "lean burn" is carried out when high speed valve timing is selected if KCMD is continuously held at a value thereof in the immediately preceding loop when the valve timing has been changed. To eliminate such possibility, therefore, the holding of KCMD at a value in the immediately preceding loop is immediately terminated if the valve timing is changed.

At a step S18, it is determined whether or not the engine is in fuel cut mode. If the answer to this question is affirmative (YES), a TDC counter NFB is set to a predetermined value NTDCX (e.g. 6) (step S19), and it is determined whether or not the count value of the F/C timer tmAFC is equal to 0 (step S20). The TDC counter NFB is provided to adjust the gain of the air-fuel ratio feedback control according to the number of TDC signal pulses after termination of fuel cut. If the answer to the question of the step S20 is negative (NO), i.e. if the fuel cut period is less than the predetermined time period tmAFCDLY. the program proceeds to the step S22, where KCMD is held at a value thereof in the immediately preceding loop. If the answer to the question of the step S20 is affirmative (YES), i.e. if the fuel cut period is equal to or longer than the predetermined time period tmAFCDLY. KCMD is set to a predetermined value KCMDFC which approximately corresponds to the stoichiometric air-fuel ratio (A/F=14.7), and the program proceeds to a step S33.

As noted above, if the fuel cut period is short (less than tmAFCDLY), KCMD is held at a value assumed in the immediately preceding loop, while if the fuel cut period is longer than tmAFCDLY, KCMD is set to the predetermined value KCMDFC which approximately corresponds to the stoichiometric air-fuel ratio. The supply air-fuel ratio immediately after termination of fuel cut is thus suitably controlled. In other words, if the fuel cut period is short, the engine operating condition shows very little change, and the desired supply air-fuel ratio can rapidly be reached by starting feedback control from the value immediately preceding the fuel cut. On the other hand, if the fuel cut period is long, KCMD is set to an essentially central value, and therefore the desired air-fuel ratio can rapidly be reached, irrespective of whether the value of KCMD which depends on the engine operating condition after termination of fuel cut is on the lean or the rich side.

If the answer to the question of the step S18 is negative (NO), i.e. if the engine is not in the fuel cut mode, an equivalent ratio $KACT_{N-1}$ representing the detected air-fuel ratio (referred to hereinafter as "detected air-fuel ratio") in the immediately preceding is calculated from the output of the LAF sensor 15 obtained in the immediately preceding loop. Then, it is determined whether or not the absolute value of the difference between the value of KCMD in the immediately preceding loop, i.e. $KCMD_{N-1}$, and the value of this equivalent ratio in the preceding loop, $KACT_{N-1}$, is less than a predetermined value DKAFC (e.g. corresponding to 0.8 in terms of A/F) (step S23). If the answer to this question is affirmative (YES), i.e. if the aforementioned difference is less than the predetermined value DKAFC, the TDC counter NFB is reset equal to 0 (step S25). If on the other hand the answer to this question is negative (NO), the count value of the counter NFB is decremented by (step S24), and the program proceeds to a step S26.

At the steps S23–S25, as described above, if the difference between the desired air-fuel ratio coefficient KCMD and the detected air-fuel ratio KACT is large (higher than DKAFC) immediately after termination of fuel cut, the count value of the TDC counter NFB is higher than 1. As a result, by another routine, the gain of the air-fuel ratio feedback control is set to a value larger than when the air-fuel ratio feedback control gain is NFB=0.

At the step S26, the aforementioned F/C timer tmAFC is set to the predetermined time period tmAFCDLY, and the timer is started. Then, a reference value KBSM of the desired air-fuel ratio coefficient is calculated (step S27), a high load desired value KWOT which is applied when the engine is in a predetermined high load operating region is calculated (step S28), and the program proceeds to a step S29.

At the step S27, the reference value KBSM is normally read from KBSM maps set according to the engine rotational speed Ne and the absolute pressure $P_{BA}$ in the intake pipe. However, when the engine coolant temperature $T_W$ is low, KBSM is read from a KTWLAF map set according to the engine coolant temperature $T_W$ and the absolute pressure $P_{BA}$ in the intake pipe. The KBSM maps comprise a map for high speed valve timing which is used when high speed valve timing is selected, and a map for low speed valve timing which is used when low speed valve timing is selected.

At the step S28, the high load desired value KWOT is read from KWOT maps set according to the engine speed Ne and the absolute pressure $P_{BA}$ in the intake pipe. The KWOT maps also comprise a map for high speed valve timing and a map for low speed valve timing.

At the step S29, it is determined whether or not a flag FWOT, which is set to I when the engine is in the predetermined high load operating region, is equal to 1. If the answer to this question is negative (NO), i.e. if the engine is not in the predetermined high load operating region, the reference value KBSM calculated in the step S27 is taken as the value of the desired air-fuel ratio coefficient in the present loop, $KCMD_N$, at a Step S32, and the program proceeds to a step S33. If the answer to the question of the step S29 is affirmative (YES), i.e. if the engine is in the predetermined high load operating region, it is determined whether or not the high load desired value KWOT is higher than the reference value KBSM (step S30). If the answer to this question is negative (NO), i.e. if KWOT <KBSM, the program proceeds to the step S32, while if the answer is affirmative (YES), i.e. if KWOT >KBSM, $KCMD_N$ is set equal to KWOT and the program proceeds to the step S33.

In this manner, the desired air-fuel ratio coefficient $KCMD_N$ is set to the reference value KBSM when the engine is operating in a region different from the predetermined high load operating region, and is set to the larger one of the reference value KBSM and the high load desired value KWOT, when the engine is operating in the predetermined high load operating region.

At the step S33, limit processing of KCMD is carried out. This limit processing is intended to prevent the difference between the value of KCMD in the immediately preceding loop and the value of KCMD in the present loop from exceeding an upper limit set according to engine operating conditions, to prevent the value of KCMD from changing abruptly. However, if the value of KCMD is leaner than the stoichiometric air-fuel ratio, it is immediately increased to a value corresponding to the stoichiometric air-fuel ratio when for example the accelerator pedal is rapidly depressed.

After KCMD limit processing, at a step S34, the fuel cooling correction coefficient KETV is read from a table according to the value of KCMD, and by multiplying with the value of KCMD, the modified desired air-fuel ratio coefficient KCMDM is calculated (step S35). Next, a limit check is performed on the value of KCMDM at a step S36, and the program is terminated. In this limit check, it is determined whether or not the value of KCMDM is within a range defined by predetermined upper and lower limits. If it is outside this range, the value of KCMDM is set to either the upper limit or the lower limit.

After executing this program, the air-fuel ratio correction coefficient KLAF is calculated such that the desired air-fuel ratio coefficient $KCMD_{N-P}$ calculated P loops previously, coincides with the value $KACT_N$ of the detected air-fuel ratio in the present loop, under engine operating conditions which permit execution of air-fuel ratio feedback control.

What is claimed is:

1. An air-fuel ratio control method for an internal combustion engine having an exhaust passage, an exhaust gas ingredient concentration sensor arranged in said exhaust passage for sensing the concentration of an ingredient in exhaust gases from said engine, and a transmission, wherein the air-fuel ratio of an air-fuel mixture supplied to said engine is feedback-controlled in response to output from said exhaust gas ingredient concentration sensor to a desired air-fuel ratio dependent on operating conditions of said engine, the method comprising the steps of:

(1) determining whether or not said transmission is being shifted;

(2) determining whether or not a predetermined time period has elapsed after shifting of said transmission, if said transmission is not being shifted; and (3) when said transmission is being shifted or before said predetermined time period elapses after the shifting, holding said desired air-fuel ratio at a value assumed immediately before the shifting of said transmission.

2. An air-fuel ratio control method as claimed in claim 1, wherein said exhaust gas ingredient concentration sensor has output characteristics approximately proportionate to the concentration of said ingredient in said exhaust gases.

3. An air-fuel ratio control method as claimed in claim 2, wherein the amount of fuel supplied to said engine is determined by multiplying a basic fuel amount by a desired air-fuel ratio coefficient set in response to said operating conditions of said engine and representing said desired air-fuel ratio and an air-fuel ratio correction coefficient calculated based on said desired air-fuel ratio coefficient and said output from said exhaust gas ingredient concentration sensor, said step (3) comprising holding said desired air-fuel ratio coefficient at a value thereof assumed immediately before the shifting of said transmission.

4. An air-fuel ratio control method for an internal combustion engine having a set of intake valves and a set of exhaust valves, at least one set of said set of intake valves and said set of exhaust valves having operating characteristics thereof changeable between ones suitable for a low engine rotational speed region and ones suitable for a high engine rotational speed region, an exhaust passage, an exhaust gas ingredient concentration sensor arranged in said exhaust passage for sensing the concentration of an ingredient in exhaust gases from said engine, and a transmission, wherein the air-fuel ratio of an air-fuel mixture supplied to said engine is feedbackcontrolled in response to output from said exhaust gas ingredient concentration sensor to a desired air-fuel ratio dependent on operating conditions of said engine, the method comprising the steps of:

(1) determining whether or not said transmission is being shifted;

(2) determining whether or not a predetermined time period has elapsed after shifting of said transmission, if said transmission is not being shifted;

(3) determining whether or not the operating characteristics of said at least one set of said set of intake valves and said set of exhaust valves have been changed if said predetermined time period has not elapsed after the shifting of said transmission; and (4) when said transmission is being shifted, or when the operating characteristics of said at least one set of said set of intake valves and said set of exhaust valves have been not changed before said predetermined time period elapses after the shifting of said transmission, holding said desired air-fuel ratio at a value assumed immediately before the shifting of said transmission.

5. An air-fuel ratio control method as claimed in claim 4, wherein said exhaust gas ingredient concentration sensor has output characteristics approximately proportionate to the concentration of said ingredient in said exhaust gases.

6. An air-fuel ratio control method as claimed in claim 5, wherein the amount of fuel supplied to said engine is determined by multiplying a basic fuel amount by a desired air-fuel ratio coefficient set in response to said operating conditions of said engine and representing said desired air-fuel ratio and an air-fuel ratio correction coefficient calculated based on said desired air-fuel ratio coefficient and said output from said exhaust gas ingredient concentration sensor, said step (4) comprising holding said desired air-fuel ratio coefficient at a value thereof assumed immediately before the shifting of said transmission.

7. An air-fuel ratio control method as claimed in claim 4, wherein said desired air-fuel ratio is set to a value dependent on a present operating condition of said engine, when the operating characteristics of said at least one set of said set of intake valves and said set of exhaust valves have been changed before said predetermined time period elapses after the shifting of said transmission.

8. An air-fuel ratio control method as claimed in claim I, wherein said engine is installed on an automotive vehicle having a clutch, and said determination as to whether or not said transmission is being shifted in said step (1) is effected by determining whether said clutch is disengaged or engaged.

9. An air-fuel ratio control method as claimed in claim 4, wherein said engine is installed on an automotive vehicle having a clutch, and said determination as to whether or not said transmission is being shifted in said step (I) is effected by determining whether said clutch is disengaged or engaged.

* * * * *